(No Model.)
J. GREMS.
WHIFFLETREE.
No. 287,376. Patented Oct. 23, 1883.
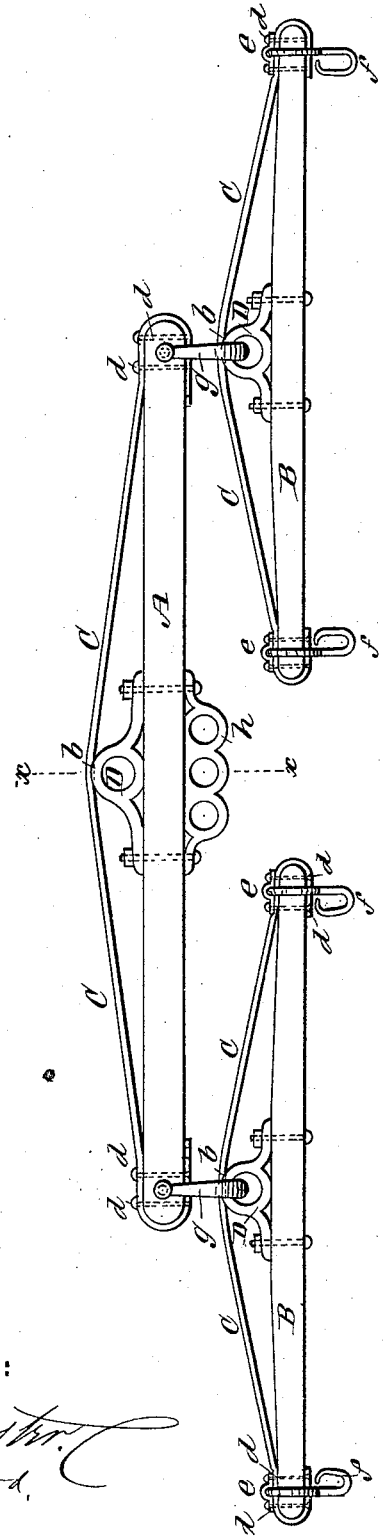
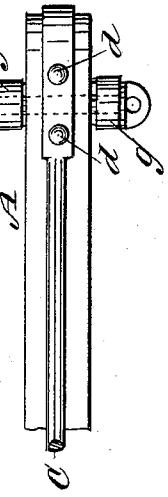
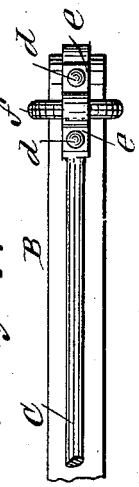
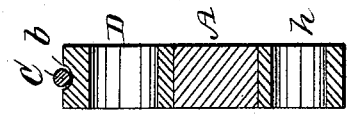
WITNESSES:
Theo G. Hoster
B. G. Underwood
INVENTOR:
J. Grems.
BY Munn & Co
ATTORNEYS.

UNITED STATES PATENT OFFICE.

JOHN GREMS, OF LEYDEN, NEW YORK.

WHIFFLETREE.

SPECIFICATION forming part of Letters Patent No. 287,376, dated October 23, 1883.

Application filed August 1, 1883. (No model.)

*To all whom it may concern:*

Be it known that I, JOHN GREMS, of Leyden, in the county of Lewis and State of New York, have invented a new and useful Improvement in the car of which is provided with and adapted in Draft Attachments for Wagons, of which the following is a full, clear, and exact description.

This invention, while applicable to neck-yokes, more particularly relates to the double and single trees of draft gear or appliances for wagons and other vehicles, and is an improvement upon that description of such trees in which the tree is strengthened by a truss or brace rod arranged to pass over a central projection on the rear side of the tree, and secured at its ends to opposite ends of the tree. It essentially differs from those arrangements in which a mere brace or strap of greater length than the tree is made to rest upon the whole length of the back of the tree, and is doubled over at its ends to overlap the ends of the tree, and is secured at such overlapping portions by end collars; also from those arrangements in which a strut is used, and the truss has its efficiency increased by inclining outward in opposite directions from the back of the tree, and has screw-threads on its ends for securing it by caps and couplings to the ends of the tree, or in which not only caps or thimbles are used, but also tension-nuts on the ends of the brace. In my invention the reversely-inclined iron brace is made to pass over and within a groove in a central metal eye-piece or bridge on the back of the tree to steady it laterally, as well as to support it at its bend, and the ends of said brace, which are doubled over the ends of the tree, are permanently secured by rivets, and in case of the single-trees by a staple constructed to receive the whiffletree-hooks or draw-irons. This forms a simple, cheap, and strong mode of securing and applying the brace, free from any tendency to work loose, and requires no adjustment, nor does it expose the ends of the wood of the tree to decay by providing for the lodgment of moisture. It also has the advantage of great lightness.

Reference is to be had to the accompanying drawings, forming part of this specification, in which similar letters of reference indicate corresponding parts in all the figures.

Figure 1 represents a top view of a double-tree or evener, with single-trees attached, embodying the invention. Fig. 2 is a transverse section, upon a larger scale, through the double-tree at the line $x$ $x$ in Fig. 1; and Figs. 3 and 4 are also views, upon a larger scale, of the double-tree and single-tree in part, as seen from their rear, and with brace and other attachments applied.

A is the double-tree or evener, and B B the single-trees, each stiffened on its back by a reversely-inclined or arched metal brace-rod, C, arranged to pass over and through a steadying and guiding groove, $b$, in a malleable-iron eye-piece or bridge, D, secured to the central portion of the back of the tree. The ends of said rod C are doubled over the ends of the wood of each tree, and are permanently secured by rivets $d\ d$, arranged to pass through the doubled-over end portions of the brace and end portion of the tree, which they thus protect, and in the case of the single-trees said overlapping end portions of the braces C are also secured by loop or staple like supports $e$, constructed to receive the whiffletree-hooks or draw-irons $f$ through them. This forms a light, strong, and simple fastening of the brace.

The single-trees B B may be secured to the double-tree by arranging the clevises $g$ to engage with the eyes of the bridges D. The double-tree or evener A may also be provided with a many-hole casting, $h$, for adjusting the draft from the center of said tree, instead of from the ends, to give one horse the advantage over the other.

I do not abandon or dedicate to the public any patentable features set forth herein and not hereinafter claimed, but reserve the right to claim the same either in a reissue of any patent that may be granted upon this application or in other applications for Letters Patent I may make.

I am aware that it is not new to form a trussed neck-yoke or whiffletree of band-iron with a tension-rod, strut-hoop, and link; or to use with a whiffletree a rear truss-rod passing at the middle over a ring and strut, and carried at the ends through metal caps on the whiffletree; but What I do claim as new and of my invention is—

1. The combination, with a whiffletree, of a rear brace, C, carried around each end of the whiffletree and there riveted, as shown and described.

2. The combination, with a whiffletree, brace, and hook, of the rivets $d\ d$ and the plate $e$, the latter provided with a middle groove fitting over the hook-shank, and on each side with a hole for a rivet, as shown and described.

JOHN GREMS.

Witnesses:
 H. W. BENTLEY,
 C. DODGE.